Patented Aug. 26, 1952

2,608,579

UNITED STATES PATENT OFFICE 2,608,579

PREPARATION OF GENTISIC ACID AND ITS ALKALI METAL AND AMMONIUM SALTS

Dorothy J. Harvey, University City, and Ferdinand B. Zienty, Brentwood, Mo., assignors to Monsanto Chemical Company, St. Louis, Mo., a corporation of Delaware No Drawing. Application May 20, 1949,
Serial No. 94,512

17 Claims. (Cl. 260—521)

This invention relates to 2,5-dihydroxy benzoic acid, or as it is more commonly called, gentisic acid, and its alkali metal or ammonium salts; more specifically, this invention relates to an improved process for the production of gentisic acid and its alkali metal and ammonium salts, which comprises subjecting an alkali metal or ammonium salt of hydroquinone to reaction with carbon dioxide in the presence of water.

The Kolbe synthesis has generally been considered to be a most convenient method for preparing hydroxy aromatic carboxylic acids and their alkali metal salts. Basically this synthesis consists in the preparation of the anhydrous alkali metal phenolate to be carboxylated followed by the subjection of the alkali metal phenolate to the action of gaseous carbon dioxide under relatively high pressures and at elevated temperatures. Originally this synthesis was carried out in the absence of any liquid diluent or liquid reaction medium. In such instances the solid anhydrous alkali metal phenolate was prepared and charged to an autoclave wherein it was carboxylated with $CO_2$. Subsequent investigations revealed carboxylation processes could be carried out on an alkali metal phenolate dissolved or suspended in anhydrous inert organic medium. In such a process, the alkali metal phenolate is generally separately prepared by reacting an alkali metal hydroxide with the phenol in the organic medium and stripping off the water formed in this reaction. In either of these processes, commercially practical yields of the desired hydroxy aromatic carboxylic acid could be obtained only if anhydrous conditions are maintained. The presence of water, either in small amounts as a contaminant or as the liquid carrier, retarded the reaction so significantly that either no product was obtained or else it was obtained in insignificant yields, depending upon the particular alkali metal phenolate being carboxylated.

In either of the above mentioned processes, there exist some inherent disadvantages. The desirability of maintaining anhydrous conditions dictates the necessity of preparing the alkali metal phenolate as a separate and distinct step in the process. Furthermore, the maintenance of anhydrous conditions requires careful process control and the availability of dehydration facilities. Carboxylation with considerable quantities of externally supplied gaseous $CO_2$ requires costly equipment and spacious storage facilities.

It is an object of this invention, therefore, to provide an improved process for the production of 2,5-dihydroxy benzoic acid (gentisic acid) and its alkali metal and ammonium salts. It is another object of this invention to provide an improved and highly practical process for the production of gentisic acid and its alkali metal and ammonium salts in increased yields by the carboxylation of an alkali metal or ammonium salt of hydroquinone, wherein the formation of the alkali metal or ammonium salt of hydroquinone and its subsequent carboxylation is carried out as an essentially single step in the presence of water. Further objects will become apparent from the description of the novel process of this invention and the claims.

It has now been discovered that gentisic acid or its alkali metal or ammonium salts may be obtained in excellent and increased yields by subjecting the alkali metal or ammonium salt of hydroquinone (para-dihydroxybenzene) to reaction with carbon dioxide in the presence of water at a temperature in the range of from about 175° C. to about 200° C. and a pressure in excess of about 300 lbs. per square inch. Furthermore, it has been discovered that the novel process of this invention may be carried out by reacting hydroquinone with an alkali metal or ammonium carbonate or bicarbonate in a medium containing water at a temperature in the range of from about 175° to 200° C., and a total pressure in excess of about 300 lbs. per square inch. Under such conditions, it has been found that the alkali metal or ammonium carbonate or bicarbonate reacts with hydroquinone to form the alkali metal or ammonium salt of hydroquinone, liberating gaseous $CO_2$, which then acts as a carboxylating agent. In this novel process the $CO_2$ used to carboxylate the alkali metal or ammonium salt of hydroquinone may be autogenetically obtained from the initial reaction and the pressure autogenetically maintained within the prescribed range. It is not essential, however, that this reaction be carried out under strict autogenetic conditions, as the $CO_2$ obtained from the initial reaction between the alkali metal or ammonium carbonate or bicarbonate and hydroquinone may, in order to speed the reaction, be augmented by the introduction of $CO_2$ from an external source of supply.

In carrying out the novel process of this invention, it is preferred that approximately 2 molecular equivalents of the alkali metal or ammonium carbonate or bicarbonate be utilized for each molecular equivalent of hydroquinone. Thus, in the case of the alkali metal or ammonium bicarbonate, approximately 2 mols of the alkali metal or ammonium bicarbonate should be utilized for each mol of hydroquinone. In the case of the alkali metal or ammonium carbonates, approximately 1 mol of the alkali metal or ammonium carbonate should be utilized for each mol of hydroquinone. While stoichiometrical proportions of these reactants are preferred, these exact proportions of reactants, however, are not of a critical nature from the standpoint of this invention.

While the reaction must be carried out in a liquid medium, the quantity of liquid medium to be utilized is governed more by the nature of the equipment rather than by the chemistry of the reaction. Thus, sufficient medium should be utilized to provide for efficient agitation of the reaction mixture in the autoclave. This quantity will necessarily be governed by the nature of the reaction vessel, its construction and type of agitation provided. Fairly vigorous agitation should be utilized.

Since this reaction has now been found to take place in the presence of water, the liquid medium in which this reaction is carried out may be entirely water or it may be a liquid medium containing water. For example, the liquid medium may contain water and an organic solvent. In such instances, it is preferred that the liquid medium contain at least about 10% by weight of water. The balance of the medium may be any of the commonly used liquid organic solvents. For example, there may be used butanol, toluene, decahydronaphthalene, many of the natural gasoline factions, such as the one boiling in the range of from about 150° to 205° C., benzene, chlorobenzene, ortho-dichlorobenzene, and xylene. In such a liquid reaction medium, a concentration of water of less than about 10% by weight significantly reduces the amount of hydroquinone converted to gentisic acid. As the water content in such a medium is increased beyond 50% by weight, the conversion of hydroquinone appears to decrease to some extent until the concentration of water begins to approach 100%, at which time increased yields of gentisic acid are again realized. Thus, it is preferred in such a medium that the concentration of water be maintained within the range of from about 10% to about 50% by weight.

The temperature limitations of this reaction are quite critical, and must be maintained within the range of from about 175° to 200° C. Above and below this temperature range significant losses in yield are encountered. Similarly, the pressure must be maintained in excess of about 300 lbs. per square inch, and preferably within the range of from about 500 to 1 000 lbs. per square inch. However, pressures of the order of 5,000 lbs. per square inch may be utilized. As mentioned hereinbefore, this pressure may be maintained autogenetically of the $CO_2$ supply obtained from the formation of the alkali metal or ammonium salt of hydroquinone, augmented by the introduction of $CO_2$ from an external source of supply. While the reaction proceeds quite satisfactorily under autogenetic conditions, it has been found to be somewhat advantageous to apply an initial booster charge of about 150 lbs. per square inch pressure of $CO_2$. This booster charge facilitates the starting of the reaction, after which time the pressure may be maintained autogenetically. It is also possible to begin the reaction under autogenetic conditions, and then supply additional $CO_2$ in order to raise the pressure near the top limit of the prescribed range.

The time for the completion of the carboxylation reaction varies considerably with the nature of the equipment, method of agitation and the pressure and temperature utilized. Generally, the reaction is completed from within 8 to 16 hours.

After carboxylation, the reaction mixture contains the alkali metal or ammonium salt of gentisic acid and unreacted hydroquinone. The salt of gentisic acid may be recovered by any of the convenient methods well known to those skilled in the art, or the reaction mixture may be acidified and the liberated gentisic acid recovered by methods also well known to those skilled in the art.

The following examples are illustrative of the novel process of this invention:

Example I

An iron autoclave was charged with 55 g. of hydroquinone, 84 g. of sodium bicarbonate, and 100 ml. of water. The autoclave was then swept clear of air with $CO_2$ and an initial pressure of 100 lbs. per square inch of $CO_2$ applied. With constant agitation the autoclave was heated to 185° to 190° C. and at this temperature the pressure rose to approximately 600 lbs. per square inch, at which temperature and pressure the reaction was maintained for 12 hours.

The autoclave was then cooled, vented, and the reaction mixture diluted with 100 ml. of water and filtered. The filtrate was acidified to a pH of about 1 to 1.5 with concentrated sulfuric acid and extracted with three 100 ml. portions of butanol. The butanol extract was then treated with a saturated solution of sodium bicarbonate. The butanol layer was evaporated to recover the unreacted hydroquinone. The water layer containing the sodium salt of gentisic acid was then again acidified to a pH of about 1 to 1.5 and extracted with butanol. The butanol was evaporated and an 87% yield of crude gentistic acid, based on recovered hydroquinone, obtained. This crude gentisic acid was then purified by crystallization from water, obtaining fine white needle crystals of gentisic acid having a melting point of 205° to 206° C.

Example II

The critical nature of the temperature limitations of this reaction was illustrated by repeating the procedure described in Example I with the exception that the reaction temperature was maintained at about 160° C. In this case an impractical low conversion of hydroquinone was obtained.

Example III

As further illustration of the critical nature of the temperature limitations of this reaction, the procedure described in Example I was repeated with the exception that the reaction temperature was maintained at about 210° to 215° C. Under such conditions the gentisic acid was so severely charred that practically no yield of a suitable product was obtained.

Example IV 55 g. of hydroquinone, 100 g. of potassium bicarbonate and about 220 ml. of water were charged to an iron autoclave which was then swept free of air with $CO_2$. Without applying an initial positive $CO_2$ pressure to the system, the autoclave was closed and heated to about 195° C. during which time the pressure rose to within the preferred pressure range where it was maintained with continuous stirring for about 15 hours.

The autoclave was then cooled and vented and the gentisic acid separated and purified in the manner described in Example I. The yield of gentisic acid obtained in this case was comparable to that obtained in Example I.

Example V

To an iron autoclave equipped with an efficient agitator was charged 55 g. of hydroquinone, 53 g. of sodium carbonate and about 110 ml. of water. The system was swept clear of air with $CO_2$ and then rapidly heated to a temperature of about 190° C. and maintained at a pressure of about 550 lbs. per square inch by the periodic addition of gaseous $CO_2$. After maintaining the reaction mixture at this temperature and pressure for about 12 hours, the autoclave was cooled and vented and an excellent yield of sodium gentisate obtained.

Example VI 55 g. of hydroquinone, 53 g. of sodium carbonate, 195 g. of ortho-dichlorobenzene, and 30 g. of water were charged to an iron autoclave equipped with an agitator. With continuous stirring the autoclave was swept free of air with $CO_2$, a booster charge of 150 lbs. per square inch of $CO_2$ pressure applied and the autoclave heated rapidly to 185° to 190° C. The pressure was raised and maintained at about 450 to 500 lbs. per square inch for a total of 12 hours.

The autoclave was cooled and vented and the reaction mixture washed with 400 ml. of water. The mixture was filtered, and on standing, the filtrate separated into an organic layer and an aqueous layer. The water layer was separated and acidified with sulfuric acid to a pH of about 2.5 and then extracted with three 100 ml. portions of butanol. The butanol extract was treated with a saturated solution of sodium bicarbonate. The butanol layer was evaporated to recover the unreacted hydroquinone. The water layer containing the sodium salt of gentisic acid was again acidified to a pH of about 2.5 and extracted with butanol. The butanol was evaporated, thereby obtaining crude gentisic acid which was then purified by recrystallization from water obtaining fine white crystals of gentisic acid having a melting point of 205° to 206° C. Crude gentisic acid was obtained in an 87% yield based on recovered hydroquinone.

Example VII

The critical nature of the temperature limitations of this reaction was again illustrated by repeating the procedure described in Example VI with the exception that the reaction temperature was maintained at about 160° C. In this case an impractical low conversion of hydroquinone was obtained.

Example VIII

As further illustration of the critical nature of the temperature limitations of this reaction, the procedure described in Example VI was repeated with the exception that the reaction temperature was maintained at about 210° to 215° C. Under such conditions the gentisic acid was so severely charred that practically no yield of a suitable product was obtained.

Example IX

The procedure described in Example VI was repeated with the exception that the liquid medium contained 195 g. of ortho-dichlorobenzene and 5 g. of water. In this case practically no conversion took place.

Example X

An iron autoclave was charged with 55 g. of hydroquinone, 84 g. of sodium bicarbonate, 200 g. of butanol and 80 g. of water. The autoclave was swept free of air with $CO_2$ and then without applying an initial positive $CO_2$ pressure to the system, the autoclave was closed and heated to about 190° C., during which time the pressure rose to within the prescribed pressure range where it was maintained with continuous stirring for about 15 hours.

The autoclave was then cooled and vented and the gentisic acid separated and purified in the manner described in Example VI.

Example XI 110 g. of hydroquinone, 138 g. of potassium carbonate, 125 g. of toluene and 125 g. of water were charged to an iron autoclave equipped with an efficient agitator. The system was swept clear of air with $CO_2$ and then rapidly heated to a temperature of about 190° C. The pressure was allowed to rise and maintained at a pressure of about 700 lbs. per square inch by the periodic addition of gaseous $CO_2$. After maintaining the reaction mixture at this temperature and pressure for about 14 hours, the autoclave was cooled and vented thereby obtaining an excellent yield of potassium gentisate.

Example XII

An iron autoclave was charged with 55 g. of hydroquinone, 79 g. of ammonium bicarbonate, 200 g. of butanol and 75 g. of water. The autoclave was swept free of air with $CO_2$ and then, without applying an initial positive $CO_2$ pressure to the system, the autoclave was closed and heated to about 185° C., during which time the pressure rose to within the prescribed range where it was maintained with continuous stirring for 14 hours. After cooling and venting the autoclave, gentisic acid was separated and purified in the manner described in Example VI.

Example XIII 110 g. of hydroquinone, 114 g. of ammonium carbonate, $(NH_4)_2CO_3 \cdot H_2O$, 130 g. of toluene and 110 g. of water were charged to an iron autoclave. The system was swept clear of air with $CO_2$ and then rapidly heated to a temperature of about 195° C. with constant agitation. The pressure was allowed to rise and maintained at a pressure of about 650 lbs. per square inch by the periodic addition of gaseous $CO_2$. After maintaining the reaction mixture under these conditions for about 15 hours, the autoclave was cooled and vented and an excellent yield of ammonium gentisate recovered.

Example XIV 110 g. of hydroquinone, 200 g. of potassium bicarbonate, 140 g. of toluene, and about 115 g. of water were charged to an iron autoclave. The autoclave was closed and heated to about 180° C. during which time the pressure rose to within the preferred pressure range where it was maintained with continuous stirring for about 14 hours.

After the reaction was complete, the autoclave was cooled and vented and an excellent yield of potassium gentisate obtained.

Example XV

An iron autoclave was charged with 110 g. of hydroquinone, 168 g. of sodium bicarbonate, 400 g. of ortho-dichlorobenzene and 160 g. of water. The autoclave was closed and then heated to about 185° C. with continuous stirring. The pressure rose to within the prescribed pressure range where it was maintained for about 15 hours.

After this reaction period, the autoclave was cooled and vented and the gentisic acid separated and purified in the manner described in Example VI.

What is claimed is:

1. A process of carboxylating hydroquinone which comprises subjecting a compound selected from the group consisting of the alkali metal and ammonium salts of hydroquinone to reaction with carbon dioxide in the presence of water at a temperature in the range of from about 175° C. to about 200° C. and a pressure in excess of about 300 lbs. per square inch.

2. A process of carboxylating hydroquinone which comprises reacting hydroquinone with a compound selected from the group consisting of the alkali metal and ammonium carbonates and bicarbonates in the presence of water at a temperature in the range of from about 175° C. to about 200° C. and a pressure in excess of about 300 lbs. per square inch.

3. In a process for the preparation of 2,5-dihydroxy benzoic acid and its alkali metal and ammonium salts, the step comprising reacting hydroquinone with a compound selected from the group consisting of the alkali metal and ammonium carbonates and bicarbonates in the presence of water at a temperature in the range of from about 175° C. to about 200° C. and a pressure in excess of about 300 lbs. per square inch.

4. In a process for the preparation of 2,5-dihydroxy benzoic acid and its alkali metal and ammonium salts, the step comprising reacting hydroquinone with a compound selected from the group consisting of the alkali metal and ammonium carbonates and bicarbonates in the presence of water and carbon dioxide at a temperature in the range of from about 175° C. to about 200° C. and a pressure in excess of 300 lbs. per square inch.

5. In a process for the preparation of 2,5-dihydroxy benzoic acid and its alkali metal and ammonium salts, the step comprising reacting hydroquinone with a compound selected from the group consisting of the alkali metal and ammonium carbonates and bicarbonates in water at a temperature in the range of from about 175° C. to about 200° C. and a pressure in excess of 300 lbs. per square inch.

6. In a process for the preparation of 2,5-dihydroxy benzoic acid and its alkali metal and ammonium salts, the step comprising reacting hydroquinone with a compound selected from the group consisting of the alkali metal and ammonium carbonates and bicarbonates in water and in the presence of carbon dioxide at a temperature in the range of from about 175° C. to about 200° C. and a pressure in excess of 300 lbs. per square inch.

7. The process as described in claim 6 wherein the compound selected from the group consisting of the alkali metal and ammonium carbonates and bicarbonates is sodium bicarbonate and wherein the pressure is maintained within the range of from about 500 to 1,000 lbs. per square inch.

8. The process as described in claim 6 wherein the compound selected from the group consisting of the alkali metal and ammonium carbonates and bicarbonates is potassium bicarbonate and wherein the pressure is maintained within the range of from about 500 to 1,000 lbs. per square inch.

9. The process as described in claim 6 wherein the compound selected from the group consisting of the alkali metal and ammonium carbonates and bicarbonates is sodium carbonate and wherein the pressure is maintained within the range of from about 500 to 1,000 lbs. per square inch.

10. In a process for the preparation of 2,5-dihydroxy benzoic acid and its alkali metal and ammonium salts, the step comprising reacting hydroquinone with a compound selected from the group consisting of the alkali metal and ammonium carbonates and bicarbonates in a liquid medium containing an organic solvent and at least 10% by weight of water at a temperature in the range of from about 175° C. to about 200° C. and a pressure in excess of 300 lbs. per square inch.

11. In a process for the preparation of 2,5-dihydroxy benzoic acid and its alkali metal and ammonium salts, the step comprising reacting hydroquinone with a compound selected from the group consisting of the alkali metal and ammonium carbonates and bicarbonates in a liquid medium containing an organic solvent and at least 10% by weight of water and in the presence of carbon dioxide at a temperature in the range of from about 175° C. to about 200° C. and a pressure in excess of 300 lbs. per square inch.

12. In a process for the preparation of 2,5-dihydroxy benzoic acid and its alkali metal and ammonium salts, the step comprising reacting hydroquinone with a compound selected from the group consisting of the alkali metal and ammonium carbonates and bicarbonates in a liquid medium containing an organic solvent and from about 10% to about 50% by weight of water at a temperature in the range of from about 175° C. to about 200° C. and a pressure in excess of 300 lbs. per square inch.

13. In a process for the preparation of 2,5-dihydroxy benzoic acid and its alkali metal and ammonium salts, the step comprising reacting hydroquinone with a compound selected from the group consisting of the alkali metal and ammonium carbonates and bicarbonates in a liquid medium containing an organic solvent and from about 10% to about 50% by weight of water and in the presence of carbon dioxide at a temperature in the range of from about 175° C. to about 200° C. and a pressure in excess of 300 lbs. per square inch.

14. The process as described in claim 13 wherein the organic solvent is ortho-dichlorobenzene.

15. The process as described in claim 13 wherein the compound selected from the group consisting of the alkali metal and ammonium carbonates and bicarbonates is sodium bicarbonate and the organic solvent is ortho-dichlorobenzene.

16. The process as described in claim 13 wherein the organic solvent is butanol.

17. The process as described in claim 13 wherein the compound selected from the group consisting of the alkali metal and ammonium carbonates and bicarbonates is sodium bicarbonate and the organic solvent is butanol.

DOROTHY J. HARVEY.
FERDINAND B. ZIENTY.

REFERENCES CITED

The following references are of record in the file of this patent:

UNITED STATES PATENTS

| Number  | Name   | Date          |
|---------|--------|---------------|
| 529,182 | Marase | Nov. 13, 1894 |

FOREIGN PATENTS

| Number  | Country       | Date          |
|---------|---------------|---------------|
| 12,191  | Great Britain | 1889          |
| 888,483 | France        | Dec. 14, 1943 |

OTHER REFERENCES

Drechsel: Zeit fur Chemie, 8 Jahig., 1865, pp. 580–581.

Senhofer et al.: Beilstein (Handbuch, 4th ed.), vol. 10, pp. 377, 384 (1927).